United States Patent
Wakrat et al.

(10) Patent No.: US 9,063,728 B2
(45) Date of Patent: Jun. 23, 2015

(54) SYSTEMS AND METHODS FOR HANDLING HIBERNATION DATA

(75) Inventors: Nir Wakrat, Los Altos, CA (US); David J. Yeh, Redwood City, CA (US); Christopher P. Dudte, San Jose, CA (US)

(73) Assignee: APPLE INC., Cupertino, CA (US)

( * ) Notice: Subject to any disclaimer, the term of this patent is extended or adjusted under 35 U.S.C. 154(b) by 591 days.

(21) Appl. No.: 12/726,066

(22) Filed: Mar. 17, 2010

(65) Prior Publication Data

US 2011/0231595 A1 Sep. 22, 2011

(51) Int. Cl.
*G06F 12/02* (2006.01)
*G06F 1/32* (2006.01)
*G06F 1/26* (2006.01)

(52) U.S. Cl.
CPC .............. *G06F 1/3203* (2013.01); *G06F 12/02* (2013.01); *G06F 1/26* (2013.01)

(58) Field of Classification Search
CPC ............. G06F 1/26; G06F 1/32; G06F 12/02; G06F 12/00
USPC .......... 711/103, 166, 154, E12.001, E12.008; 713/300, 310, 320, 323, 324, 340, 1
See application file for complete search history.

(56) References Cited

U.S. PATENT DOCUMENTS

| | | | |
|---|---|---|---|
| 5,708,820 A * | 1/1998 | Park et al. | 713/323 |
| 6,209,088 B1 * | 3/2001 | Reneris | 713/1 |
| 6,336,153 B1 * | 1/2002 | Izumida et al. | 711/168 |
| 6,574,717 B1 | 6/2003 | Ngai et al. | |
| 6,609,182 B1 * | 8/2003 | Pedrizetti et al. | 711/159 |
| 7,308,587 B2 * | 12/2007 | Inui et al. | 713/310 |
| 7,634,592 B2 * | 12/2009 | Kadatch et al. | 713/323 |
| 8,380,676 B1 | 2/2013 | Eastham et al. | |
| 8,694,814 B1 * | 4/2014 | Salomon et al. | 713/300 |
| 2003/0126391 A1 | 7/2003 | Neufeld et al. | |
| 2005/0044332 A1 * | 2/2005 | de Brebisson | 711/103 |
| 2005/0117418 A1 | 6/2005 | Jewell et al. | |
| 2006/0288153 A1 | 12/2006 | Tanaka et al. | |
| 2007/0234028 A1 * | 10/2007 | Rothman et al. | 713/1 |
| 2008/0082616 A1 * | 4/2008 | Morisawa et al. | 709/206 |
| 2008/0082743 A1 * | 4/2008 | Hanebutte et al. | 711/113 |
| 2008/0104308 A1 | 5/2008 | Mo et al. | |
| 2008/0307158 A1 | 12/2008 | Sinclair | |

(Continued)

FOREIGN PATENT DOCUMENTS

EP 2299364 3/2011

OTHER PUBLICATIONS

Birrell et al. "A Design for High-Performance Flash Disks." Apr. 2007. ACM. ACM SIGOPS Operating Systems Review. vol. 41. pp. 88-93.

(Continued)

*Primary Examiner* — Pierre-Michel Bataille
(74) *Attorney, Agent, or Firm* — Van Court & Aldridge LLP

(57) ABSTRACT

Systems and methods are disclosed for storing hibernation data in a non-volatile memory ("NVM"). Hibernation data is data stored in volatile memory that is lost during a reduced power event, but is needed to restore the device to the operational state it was in prior to entering into the reduced power event. When a reduced power event occurs, the hibernation data is stored in the NVM. When the device "wakes up" the hibernation data is retrieved and used to restore the device to its prior operational state.

16 Claims, 7 Drawing Sheets

(56) References Cited

U.S. PATENT DOCUMENTS

| | | |
|---|---|---|
| 2009/0240678 A1 | 9/2009 | Sadovsky et al. |
| 2010/0049775 A1 | 2/2010 | Rajawat |
| 2010/0106886 A1* | 4/2010 | Marcu et al. .................. 711/102 |
| 2010/0161121 A1* | 6/2010 | Finsterwalder ............... 700/245 |
| 2010/0169540 A1 | 7/2010 | Sinclair |
| 2010/0235594 A1 | 9/2010 | Heller et al. |
| 2010/0325351 A1 | 12/2010 | Bennett |
| 2011/0066808 A1 | 3/2011 | Flynn et al. |
| 2011/0113183 A1 | 5/2011 | Lee et al. |
| 2011/0225388 A1 | 9/2011 | Oh et al. |

OTHER PUBLICATIONS

Jo et al. "FAB: Flash-Aware Buffer Management Policy for Portable Media Players." May 2006. IEEE. IEEE Transactions on Consumer Electronics. vol. 52., No. 2. pp. 485-493.

Joe et al. "Bootup Time Improvement for Embedded Linux using Snapshot Images Created on Boot Time." Next Generation Information Technology (ICNIT). 2011 The 2nd International Conference on IEEE. Jun. 21, 2011. pp. 193-196.

* cited by examiner

SYSTEMS AND METHODS FOR HANDLING HIBERNATION DATA

FIELD OF THE INVENTION

This can relate to systems and methods for storing volatile memory data in memory locations of a non-volatile memory.

BACKGROUND OF THE DISCLOSURE

NAND flash memory, as well as other types of non-volatile memories ("NVMs"), are commonly used in electronic devices for mass storage. For example, consumer electronics such as portable media players often include flash memory to store music, videos, and other media.

Electronic devices equipped with NVM can be programmed to operate in a reduced power state. In the reduced power state, various circuitry or components may be turned OFF, such as a display screen, processor, memory, and NVM. Certain circuitry, such as the memory (e.g., RAM) can include data that will be lost when turned OFF. However, all or a portion of this data is needed when the device returns to a normal power state (e.g., the device wakes up) so the device can return to the operational state it was in prior to entering the reduced power state. Accordingly, techniques are needed to efficiently store this data in NVM when the device is about enter into a reduced power state.

SUMMARY OF THE DISCLOSURE

Accordingly, systems and methods are disclosed for storing hibernation data in a non-volatile memory ("NVM"). Hibernation data is data stored in volatile memory that is lost during a reduced power event, but is needed to restore the device to the operational state it was in prior to entering into the reduced power event. When a reduced power event occurs, the hibernation data is stored in the NVM. When the device "wakes up" the hibernation data is retrieved and used to restore the device to its prior operational state.

In some embodiments, an electronic device is provided that may include a system-on-a-chip and a NVM. The NVM may include flash memory, such as NAND flash memory, or any other suitable type of non-volatile memory. In some embodiments, the NVM may be partitioned to include a user data portion and a hibernation data portion. By providing a hibernation portion within the NVM, sufficient space may be readily available to store the hibernation data. The size of the hibernation data portion may be fixed. In other embodiments, the size of the hibernation data portion may change dynamically. For example, if the volatile memory capacity changes, the size of the hibernation data portion may change.

The system-on-a-chip can include a NVM interface, sometimes referred to herein as a "memory interface," for accessing the NVM. The memory interface may map logical address to a physical address and may store data at the physical address of the NVM. In one embodiment, any suitable number of logical addresses may be marked as hibernation logical addresses for hibernation data storage and the remaining logical addresses may be used for user data storage. Thus, when hibernation data is stored in NVM, it is stored using the hibernation logical addresses.

In some embodiments, a set of commands or lingoes may be provided to enable the NVM interface to handle hibernation data. For example, the commands can instruct the NVM interface to switch between operating in a hibernation mode and a non-hibernation mode. In the hibernation mode, commands such as program and read may be performed with respect to the hibernation portion of the NVM, whereas in the non-hibernation mode, such commands may be performed with respect to the user data portion of the NVM.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
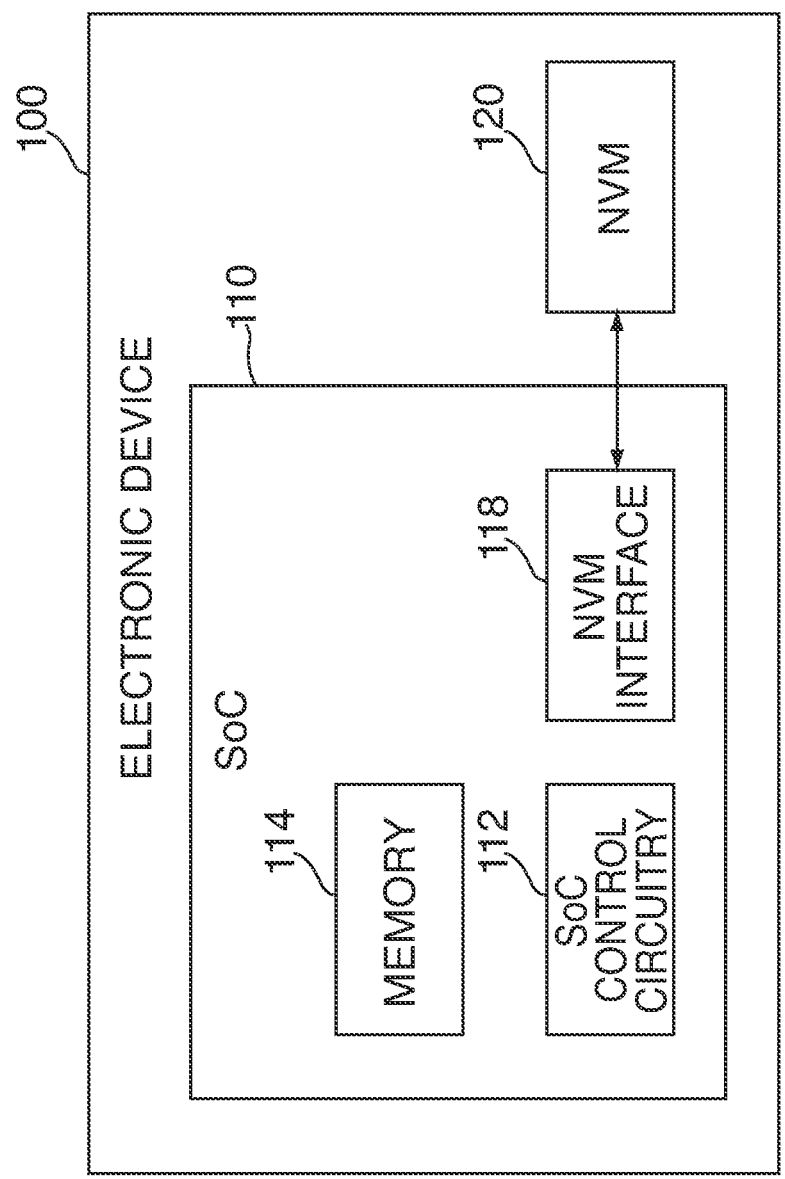
FIGS. 1 and 2 are schematic views of electronic devices configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), any other known or future types of non-volatile memory technology, or any combination thereof. NVM 120 can be organized into "blocks" that may each be erasable at once, and further organized into "pages" that may each be programmable and readable at once. In some embodiments, NVM 120 can include multiple integrated circuits, where each integrated circuit may have multiple blocks. The blocks from corresponding integrated circuits (e.g., blocks having the same position or block number) may form "super blocks." Each memory location (e.g., page or block) of NVM 120 can be addressed using a physical address (e.g., a physical page address or physical block address).

FIG. 1, as well as later figures and various disclosed embodiments, may sometimes be described in terms of using flash technology. However, this is not intended to be limiting, and any other type of non-volatile memory can be implemented instead. Electronic device 100 can include other components, such as a power supply or any user input or output components, which are not depicted in FIG. 1 to prevent overcomplicating the figure.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112. In other embodiments, memory 114 can contain hibernation data. Hibernation data may include data that enables device 100 to return to its pre-hibernation operational state (e.g., the state it was in prior to entering into a reduced power state) when it wakes up from a hibernation state. The hibernation data may represent the current operational states of the device, for both hardware and software. For example, device state data may specify which programs are actively running, or more specifically, which media asset (e.g., song) is being played back, or the position within the graphical user interface the user is currently accessing.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write commands from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, a processor implemented as part of SoC control circuitry 112 may execute a software-based memory driver for NVM interface 118. Accordingly, portions of SoC control circuitry 112 and NVM interface 118 may sometimes be referred to collectively as "control circuitry."

FIG. 1 illustrates an electronic device where NVM 120 may not have its own controller. In other embodiments, electronic device 100 can include a target device, such as a flash or SD card or a SSD, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
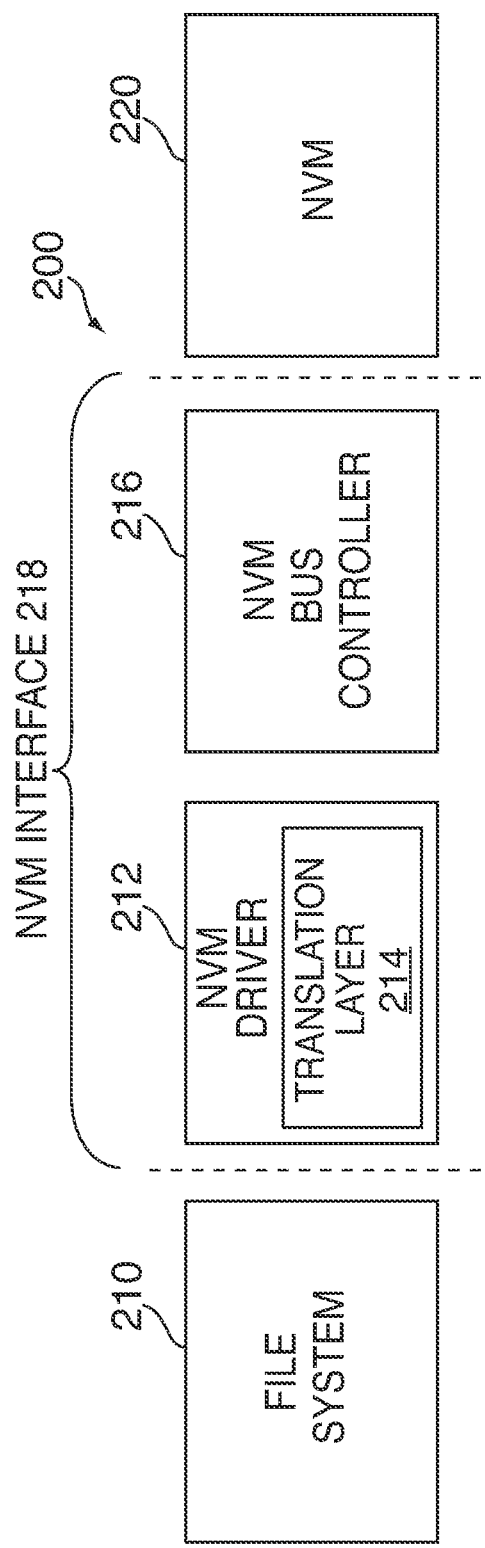

FIG. 2 is a schematic view of electronic device 200, which may illustrate in greater detail some of the firmware, software and/or hardware components of electronic device 100 (FIG. 1) in accordance with various embodiments. Electronic device 200 may have any of the features and functionalities described above in connection with FIG. 1, and vice versa. Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system, and may be part of the operating system of electronic device 200 (e.g., part of SoC control circuitry 112 of FIG. 1). In some embodiments, file system 210 may include a flash file system, which provides a logical to physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write operation, translation layer 214 can map the provided logical address to a free, erased physical location on NVM 220. On a read operation, translation layer 214 can use the provided logical address to determine the physical address at which the requested data is stored. Because each NVM may have a different layout depending on the size or vendor of the NVM, this mapping operation may be memory and/or vendor specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata." The metadata may be generated by NVM driver 212 or may be generated by a module operating under the control of NVM driver 212. For example, metadata can include any information used for managing the mapping between logical and physical addresses, bad block management, wear leveling, error correcting code ("ECC") data, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one memory location of NVM 220. NVM interface 218 may also store other types of metadata about the user data in the same memory location.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate table maintaining the physical-to-logical mapping in NVM 220 becomes outdated, NVM interface 218 may still determine the proper mapping at power-up or reboot of electronic device 200, for example.

Electronic device 100 may operate in one of several different modes and may switch between these modes depending on various factors. In simple terms, the operating modes can include a normal operating mode, one or more reduced power operating modes, and an OFF mode. The normal operating mode can represent a mode in which the device is fully ON, for example, to enable a user to interact with an interface of the device. Each reduced power mode can represent a degree in which various electrical components or processes are throttled back or powered OFF. For example, in one embodiment, device 100 may have two reduced power modes. The first reduced power mode may, for example, power down a backlight (not shown) after a predetermined period of user inactivity has expired. The second reduced power mode may, for example, power down additional components such as processor 112 and memory 114. Despite the myriad of different reduced power mode possibilities, embodiments of the invention provide NVM storage solutions for a reduced power mode that results in the powering down of memory 114.

When memory 114 is powered down, the data stored therein is lost (i.e., because memory 114 is a volatile memory). In order for device 114 to resume operating in the same environment it was operating prior to entering into a reduced power mode, the contents or a portion of memory 114 lost in the reduced power mode need to be restored. For example, the lost memory 114 contents may indicate where within the graphical user interface the user was prior to device 100 entering the reduced power state. Returning to the same state of operation prior to entering the reduced power state provides a seamless and uninterrupted user experience. The data stored in memory 114 that enables device 100 to return to its pre-reduced power mode state after it enters into a reduced power mode is referred to herein as hibernation data.

Figure 3:
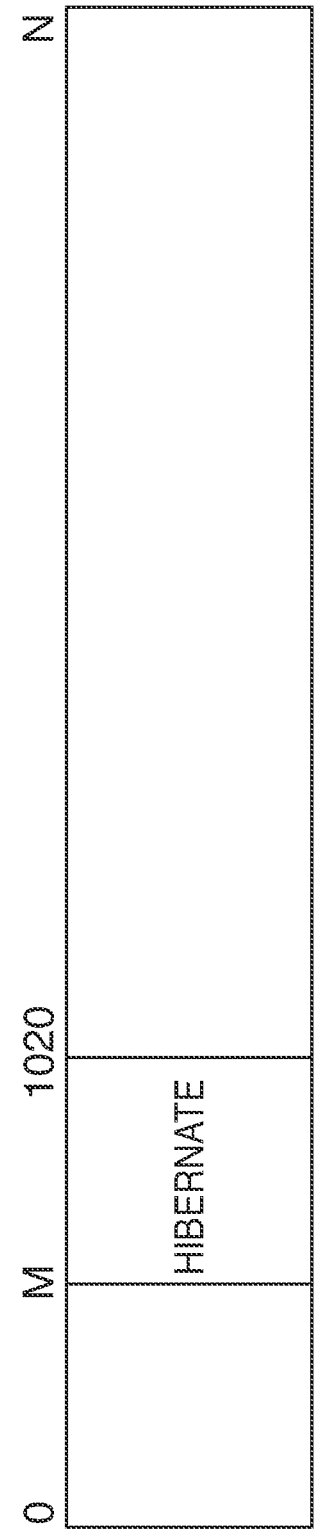
FIG. 3 is an illustrative view of volatile memory in accordance with various embodiments of the invention.

Referring now to FIG. 3, an illustrative block diagram of volatile memory 114 is provided. As shown, memory 114 is partitioned into illustrative sections. One of the partitions, labeled as hibernate, illustratively represents hibernation data stored therein. The hibernation partition may vary in size, including, for example, a portion of memory 114 or the entire contents of memory 114. It is the contents of the hibernation partition that are stored in NVM 120 prior to the device entering a reduced power state or hibernation mode.

Hibernation data stored in NVM 120 may have different storage requirements than other data such as user data. Hibernation data may include a specific type of data with specific storage requirements. For example, hibernation data may only need to be read once, and only need to be maintained for a predetermined period of time. Hibernation data may be processed differently than other data. For example, hibernation data may be subjected to a substantially long sequence of writes when being written from memory 114 to NVM 120 or a long sequence of reads when being read from NVM 120.

In some embodiments, NVM 120 may have a portion specifically reserved to hold hibernation data. In general terms, NVM 120 may include a user data portion and a hibernation portion. Allocation of the hibernation portion may be static or dynamic. In another embodiment, the portion of NVM 120 dedicated for storing hibernation data may be represented by a range of logical block addresses (LBAs). The hibernation data specific LBAs may be fixed or dynamic. Various embodiments for allocating space within NVM 120 for storing hibernation data are discussed in more detail below in connection with FIGS. 4-7.

A set of commands dedicated for performing hibernation specific operations are provided. These commands may enable NVM interface 118 to access the hibernation portion of NVM 120 or hibernation LBAs when performing commands such as read and write. In addition, the hibernation commands may cause device 100 to handle hibernation data differently than how it handles user data. For example, when hibernation data is being handled, NVM interface may be operative to process the data according to a speed mode, whereas when non-hibernation data is handled it may be operative to handle the data according to a capacity mode.

The differences between speed mode and capacity mode may differ. In one embodiment, speed mode may use single level cell (SLC), whereas the capacity mode may use multi-level cell (MLC). SLC is generally faster and uses less energy than MLC, and may enable device 100 to enter into hibernation mode more quickly. Speed mode and capacity mode may also differ in any other number of factors. For example, the speed mode may use a less robust ECC engine than the capacity mode. As another example, during programming, the speed mode may use a storage charge tuning algorithm that is coarser than that used in the capacity mode.

The hibernation commands can include the following: start_hibernate_space_write, end_hibernate_space_write, start_hibernate_space_read, end_hibernate_space_read, and discard_hibernate_space. The start and end hibernate_space_write commands specify the beginning and end of hibernation storage. More particularly, start_hibernate_space_write command can inform NVM interface 118 that the following set of write commands (sometimes referred to as program commands) involve hibernation data. For example, when the start_hibernate_space_write command is received, NVM interface 118 is primed to access the hibernation portion of NVM 120. Thus, each subsequently received write command results in having the data written to the hibernation portion of NVM 120 until an end_hibernate_space_write command is received. When the end_hibernate_space_write command is received, NVM interface 118 is no longer permitted to write data to the hibernation portion.

The start and end hibernate_space_read commands specify the beginning and end of hibernation data retrieval. The start_hibernate_space_read command can inform NVM interface 118 the following set of read commands involve hibernation data. For example, when the start_hibernate_space_read command is received, NVM interface 118 is primed to access the hibernation portion of NVM 120. Thus, each subsequently received read command results in having the data read from the hibernation portion of NVM 120 until an end_hibernate_space_read command is received. When the end_hibernate_space_read command is received, NVM interface 118 may continue to access the user portion of NVM 120.

The discard_hibernate_space command may instruct NVM interface 118 to invalidate the hibernation data. In one embodiment, metadata associated with hibernation data stored in NVM 120 may be set to be invalid. In another embodiment, the hibernation LBAs may be released for use as user data, and another set of LBAs may be selected as hibernation LBAs.

Figure 4:
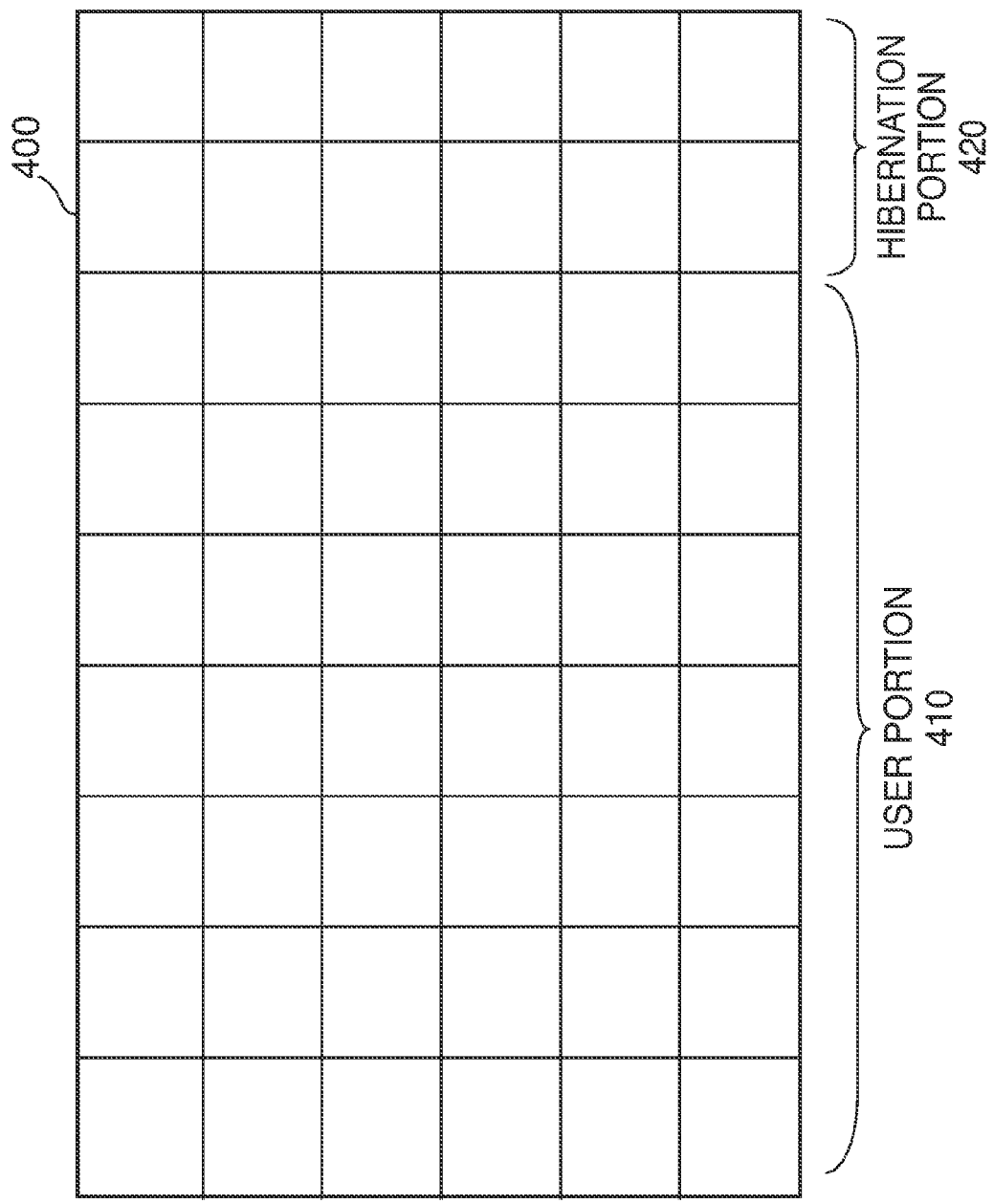
FIGS. 4 and 5 show illustrative representations of non-volatile memory in accordance with various embodiments of the invention.

Referring now to FIG. 4, an illustrative representation of NVM 400 is shown. NVM 400 is partitioned to have user portion 410 and hibernation portion 420. In one embodiment, the partition of NVM 400 may be set by the NVM manufacturer and remains fixed throughout its life. During non-hibernation operations of device 100, NVM interface 118 may not have access to hibernation portion 420 for writing or reading "user" data or any other data that is not hibernation data. For example, for non-hibernation data operations, NVM interface 118 may only be able to access physical addresses corresponding to user portion 410. However, when hibernation commands are used, these commands may permit NVM 118 to access physical addresses corresponding to hibernation portion 420.

In another embodiment, hibernation portion 420 may be used to buffer data other than hibernation data. This provides NVM interface 118 with additional working NVM that can be used on a temporary basis. When device 100 enters into a reduced power state, hibernation portion 420 is used to store hibernation data and any temporarily stored data may be erased. For example, if hibernation portion 420 is used as a buffer, the entire contents of hibernation portion 420 may be erased prior to having any hibernation data written thereto.

In yet another embodiment, although the size of hibernation portion 420 is initially fixed by the NVM manufacturer, device 100 may logically enlarge hibernation portion 420 by reserving a portion of user portion 410 for supplemental hibernation data storage. The size of the supplemental hibernation data storage may be based on the size of memory 114, user preferences, device operating characteristics, or any combination thereof.

Figure 5:
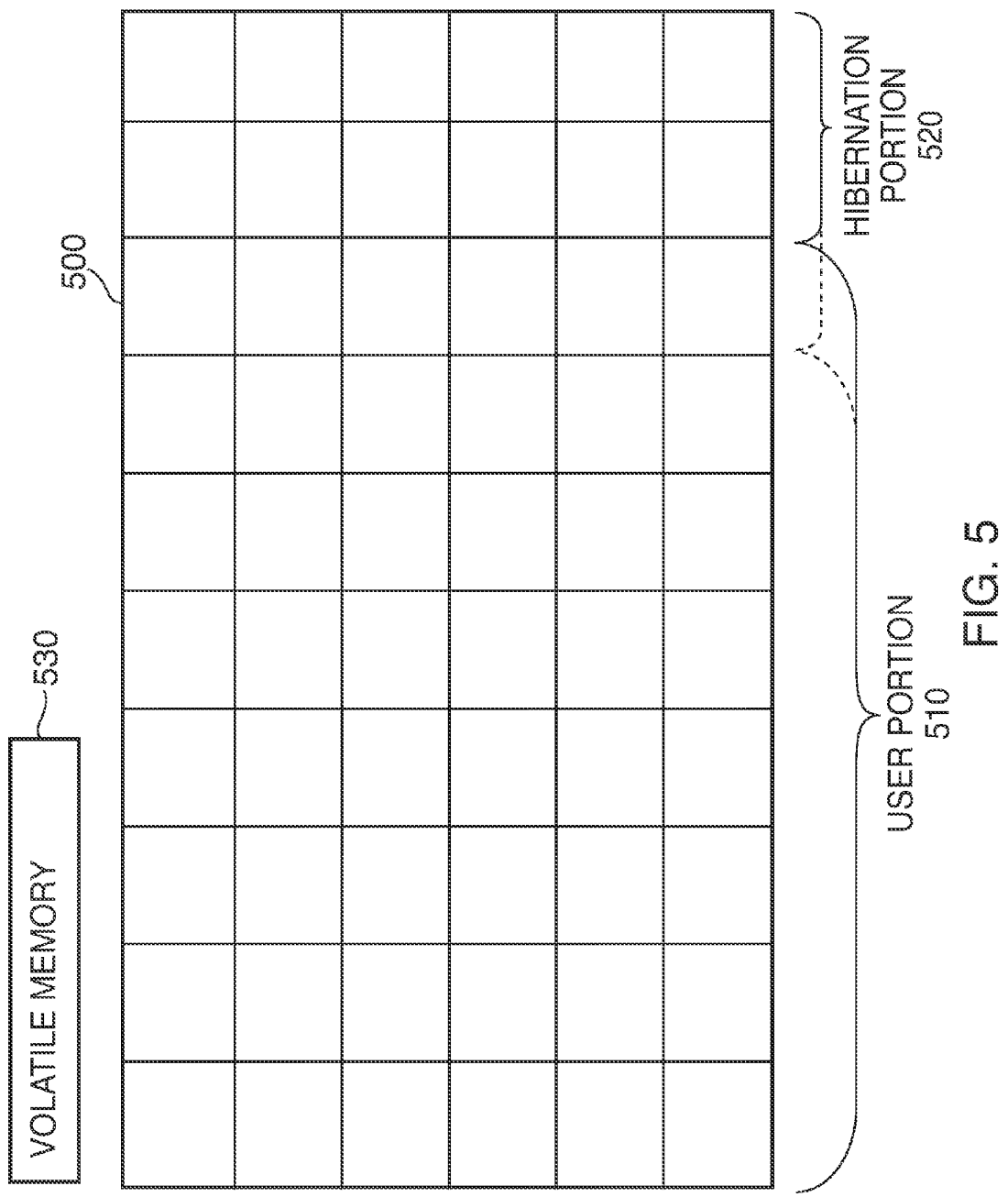

FIG. 5 shows an illustrative representation of NVM 500. NVM 500 includes a user portion 510 and hibernation portion 520. The allocation of user portion 510 and hibernation portion 520 may be set by the manufacturer of the device, by the device itself, or by any other device or entity other than the NVM manufacturer. The size of hibernation portion 520 may be based, for example, on the size of volatile memory 530. In some embodiments, the size of hibernation portion 520 may be dynamically altered, as illustrated in FIG. 5, based on any number of factors such as increased memory capacity or user preferences. The solid lines represent a first apportionment of user portion 510 and hibernation portion 520 and the dashed lines represent a second apportionment of portions 510 and 520. As shown, the size of hibernation portion 520 grows in the change from the first apportionment to the second and the size of user portion 510 shrinks in the same change.

Figure 6:
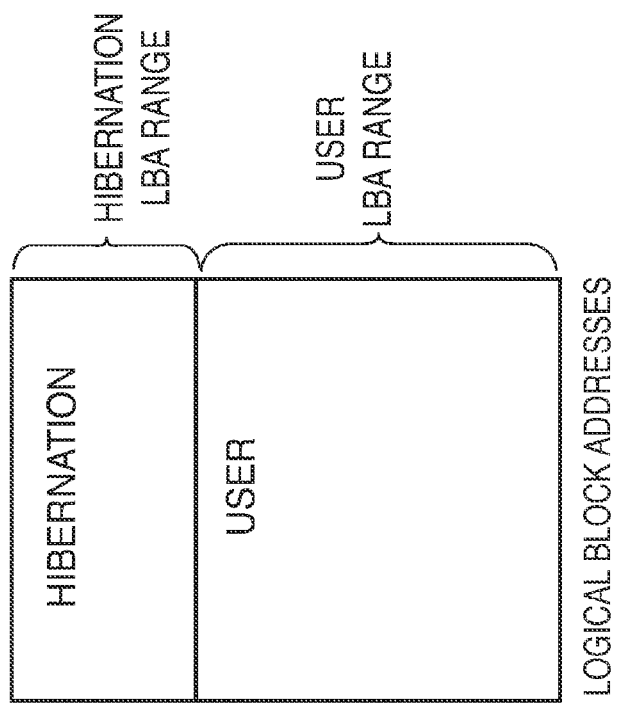

FIG. 6 shows an illustrative representation of logical block addresses apportioned to have a hibernation LBA range and a user LBA range. The hibernation LBA range of LBAs can be reserved for hibernation data and the user LBA range can be reserved for user data. The hibernation LBA range may include contiguous LBAs (as shown) or randomly ordered LBAs (not shown). The hibernation LBA range may change in size based on various factors such as memory size or user preferences. For example, if more space is needed for storing hibernation data, additional LBAs can be marked as hibernation LBAs.

Figure 7:
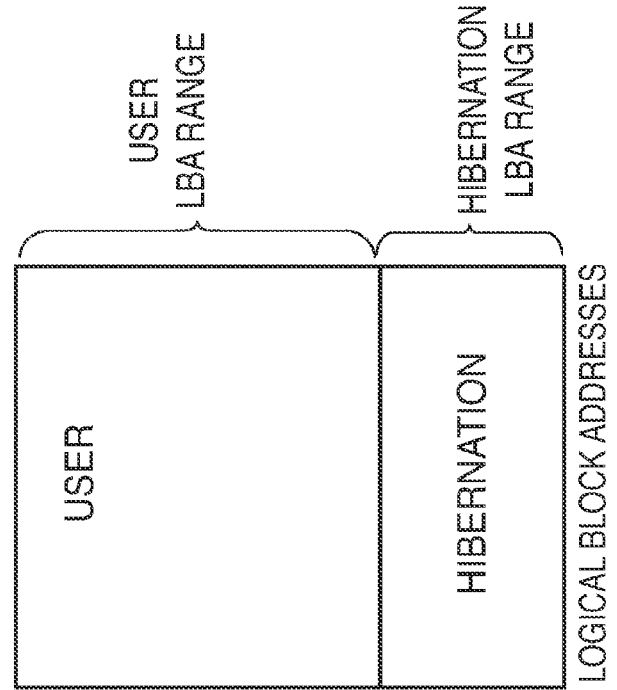
FIGS. 6 and 7 show illustrative representations of logical block addresses in accordance with various embodiments of the invention.

The hibernation LBA range need not always occupy the same LBAs. For example, the hibernation LBA range may be moved around the LBA array. That is LBAs marked as hibernation LBAs may be unmarked and different LBAs may be marked as hibernation LBAs. For example, the hibernation LBA range may be located at the tail end of the LBA array (as shown in FIG. 7) as opposed to the head end of the array.

In one embodiment, the size of hibernation portion 520 may change in response to a device upgrade to include more volatile memory. For example, if the volatile memory capacity is increased, the size of hibernation portion may be increased. In another embodiment, the size of hibernation portion may be based on user preferences. For example, a user may be presented with preferences for setting how much data or type of data he or she wishes to have retained when the device enters a reduced power state.

Figure 8:
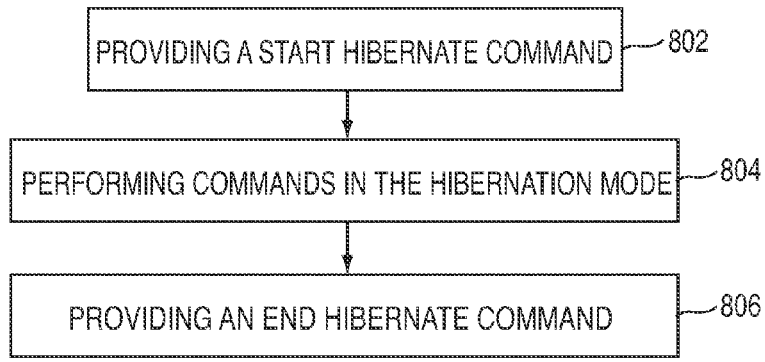
FIG. 8-12 show illustrative processes for handling hibernation data in accordance with various embodiments of the invention.

Referring now to FIGS. 8-12, various flowcharts illustrating steps for handling hibernation data are provided. FIG. 8 shows illustrative steps that may be performed by a device handling hibernation data. Beginning at step 802, a start hibernate command may be provided. The start hibernate command may be provided in response to an event indicating that the system is about to enter a reduced power state, which will result in powering down at least the volatile memory (e.g., memory 114 of FIG. 1). Alternatively, the start hibernate command may be provided in response to an event in which the device "wakes up" from a reduced power state and returns to its pre-reduced power state. The start hibernate command may instruct the device or, for example, the NVM interface to operate in a hibernation mode. When in the hibernation mode, commands are performed with respect to the hibernation portion of the NVM, as indicated by step 804. The commands can include, for example, program, read, and erase commands. At step 806, an end hibernate command is provided. The end hibernate command may instruct the device (e.g., NVM interface) that it is no longer operating in a hibernation mode and that all subsequent operations should be treated in a non-hibernation context.

Figure 9:
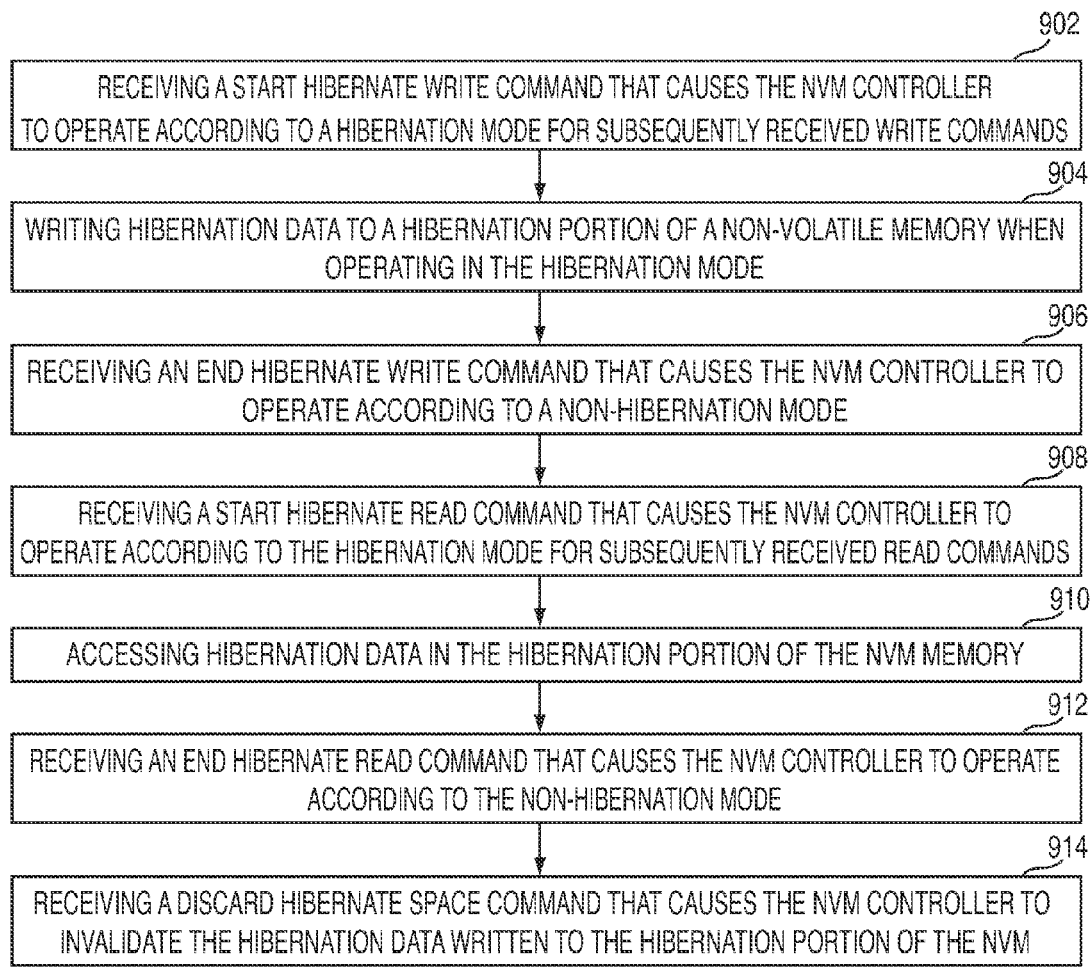

FIG. 9 shows illustrative steps that may be performed in handling hibernation data. Beginning at step 902, a start_hibernate_space_write command is received that causes the NVM controller to operate according to a hibernation mode for subsequently received write (or program) commands. At step 904, hibernation data is written to a hibernation portion of a non-volatile memory when operating in the hibernation mode. At step 906, an end_hibernate_space_write command is received that causes the NVM controller to operate according to a non-hibernation mode. This command may be provided, for example, after all the hibernation data has been written to the hibernation portion of the NVM.

At step 908, a start_hibernate_space_read command is received that causes the NVM controller to operate according to the hibernation mode for subsequently received read commands. This command may be received, for example, in response to an event that causes the device to exit out of its reduced power state. At step 910, hibernation data is accessed from the hibernation portion of the NVM when operating in the hibernation mode. The hibernation data may be used to populate volatile memory (e.g., memory 114) to enable the device to resume operation in the state it was in prior to entering a reduced power state. At step 912, an end_hibernate_space_read command is received that causes the NVM controller to operate according to the non-hibernation mode. This command may be received, for example, after the requisite hibernation data has been retrieved.

At step 914, a discard_hibernate_space command is received that cause the NVM controller to invalidate the hibernation data written to the hibernation portion of the NVM. When the hibernation data is invalidated, the hibernation portion may be erased or no longer maintained, for example, using conventional wear leveling techniques. In addition, in some embodiments, once invalidated, the hibernation portion may be used as a buffer.

Figure 10:
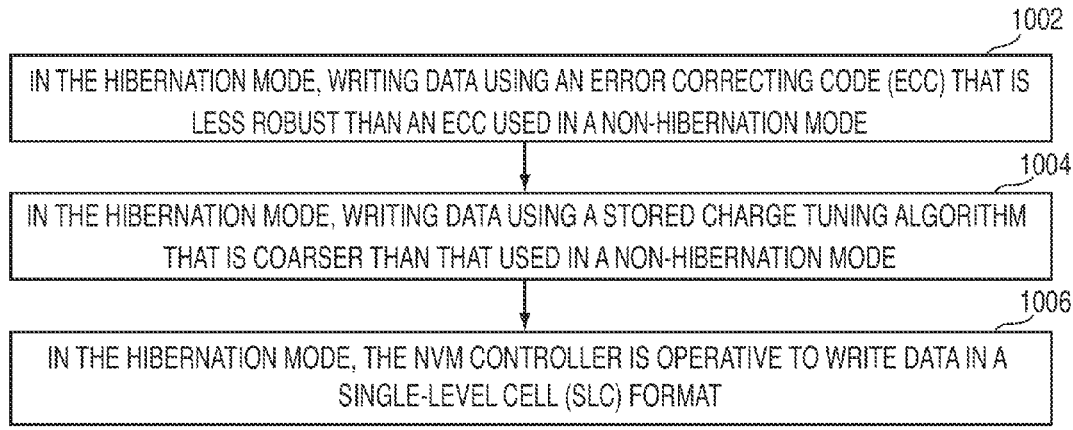

FIG. 10 shows illustrative steps that may be practiced when operating in a hibernation mode. When the device is operating in the hibernation mode, it may be desirable to write data to the hibernation portion of the NVM as fast as practically possible. Thus, NVM controller may operate according to a speed mode when in the hibernation mode. Beginning with step 1002, data is written using an error correcting code (ECC) that is less robust than ECC used in a non-hibernation mode. At step 1004, data may be written using a stored charge tuning algorithm that is coarser than that used in the non-hibernation mode. At step 1006, data may be written in a single level cell (SLC) format. It is understood that any combination of steps 1002, 1004, and 1006 may be used to implement speed mode operations.

Figure 11:
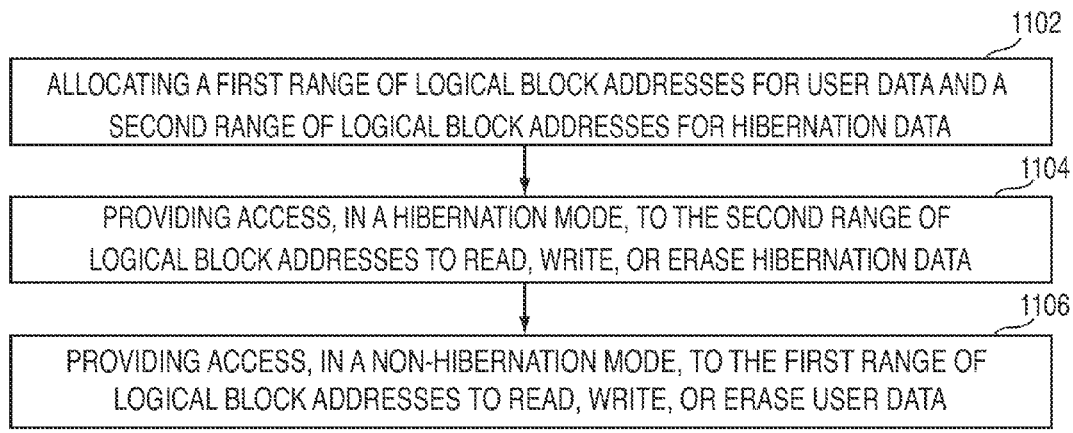

FIG. 11 shows illustrative steps in using logical block addresses (LBAs) for handling hibernation data. Beginning at step 1102, a first range of logical block addresses is allocated for user data and a second range logical block addresses is allocated for hibernation data. In a hibernation mode, access is provided to the second range of LBAs to, for example, to read, write, or erase hibernation data, as indicated by step 1104. For example, when hibernation data is stored in NVM, it is stored in physical blocks associated with the second range of LBAs. In a non-hibernation mode, access is provided to the first range of LBAs to, for example, read, write, or erase user data.

Figure 12:
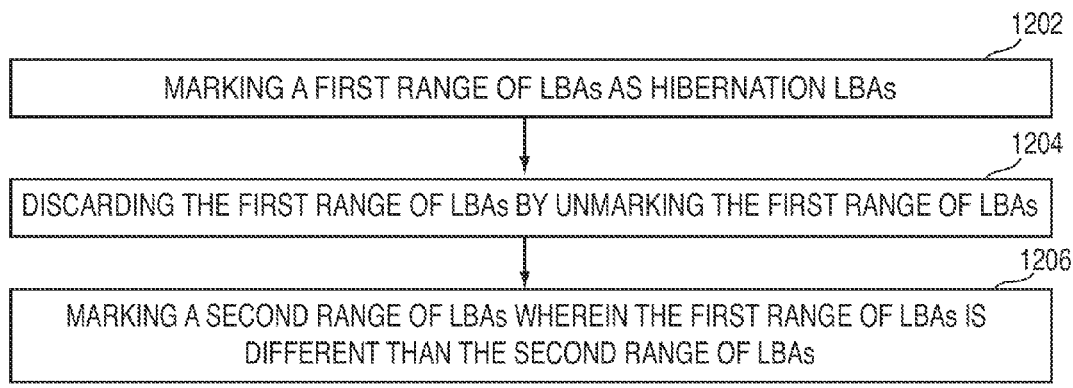

FIG. 12 shows illustrative steps in using LBAs for handling hibernation data. Beginning at step 1202, a first range of LBAs is marked as hibernation LBAs. These hibernation LBAs may be reserved for storing hibernation data in NVM during, for example, a reduced power state. When the device exits out of its reduced power state, the hibernation LBAs are referenced to obtain the desired hibernation data. After the hibernation data is retrieved, the first range of LBAs are unmarked, as indicated by step 1204. Once the first range of LBAs are unmarked, the file system is free to use these LBAs for user data storage, for example. At step 1206, a second range of LBAs may be marked as hibernation LBAs. The second range of LBAs is not the same as the first range of LBAs. However, there may be overlap of LBAs in the first and second ranges.

The described embodiments of the invention are presented for the purpose of illustration and not of limitation, and the invention is only limited by the claims which follow.

What is claimed is:

1. A method for handling hibernation data, the method comprising:
   storing temporary data in a hibernation portion of a non-volatile memory;
   receiving a start hibernate write command that causes a non-volatile memory ("NVM") controller to operate according to a hibernation mode;
   erasing the stored temporary data from the hibernation portion of the non-volatile memory;
   receiving write commands comprising hibernation data;
   writing the hibernation data to the hibernation portion of the non-volatile memory, wherein in the hibernation mode, the NVM controller is operative to write data in a single-level cell ("SLC") format; and
   receiving an end hibernate write command that causes the NVM controller to operate according to a non-hibernation mode,
   wherein in the hibernation mode, the NVM controller is operative to write the hibernation data using an error correcting code ("ECC") that is less robust than an ECC used in the non-hibernation mode.

2. The method of claim 1, further comprising:
   receiving a start hibernate read command that causes the NVM controller to operate according to the hibernation mode;
   receiving read commands;
   accessing the hibernation data in the hibernation portion of the non-volatile memory;
   receiving an end hibernate read command that causes the NVM controller to operate according to the non-hibernation mode.

3. The method of claim 2, further comprising:
   receiving a discard hibernate space command that causes the NVM controller to invalidate the hibernation data written to the hibernation portion of the non-volatile memory.

4. The method of claim 1, wherein the hibernation data includes at least a portion of data stored in volatile memory prior to being powered down.

5. The method of claim 1, wherein the hibernation data enables a device to be restored to a pre-hibernation state after the device has entered into a hibernation state.

6. A method for use in a device including volatile memory and non-volatile memory, the method comprising:
   allocating a first range of logical block addresses for user data and a second range of logical block addresses for hibernation data;
   providing access, when the device is operating in a hibernation mode, to the second range of logical block addresses to at least one of read the hibernation data from the non-volatile memory, write the hibernation data stored in the volatile memory to the non-volatile memory, and erase the hibernation data from the non-volatile memory; and
   providing access, when the device is operating in a non-hibernation mode, to the first range of logical block addresses to read the user data from the non-volatile memory, write the user data stored in the volatile memory to the non-volatile memory, and erase the user data from the non-volatile memory, wherein the hibernation data and the user data are stored in a non-volatile Flash memory organized into a plurality of blocks, wherein each block comprises a plurality of pages that are erasable together as a unit, wherein the allocating comprises dynamically allocating the first range of logical block addresses for the user data and the second range of logical block addresses for the hibernation data.

7. The method of claim 6, further comprising determining a capacity of the volatile memory, wherein the second range of logical block addresses is based on the capacity of the volatile memory.

8. A method for handling hibernation data, the method comprising:

storing temporary data in a hibernation portion of a non-volatile memory;

receiving a start hibernate write command that causes a non-volatile memory ("NVM") controller to operate according to a hibernation mode;

erasing the stored temporary data from the hibernation portion of the non-volatile memory;

receiving write commands comprising hibernation data;

writing the hibernation data to the hibernation portion of the non-volatile memory, wherein in the hibernation mode, the NVM controller is operative to write data in a single-level cell ("SLC") format; and receiving an end hibernate write command that causes the NVM controller to operate according to a non-hibernation mode, wherein in the hibernation mode, the NVM controller is operative to write the hibernation data using a stored charge tuning algorithm that is coarser than that used in the non-hibernation mode.

9. An electronic device comprising:

volatile memory operative to store hibernation data, wherein the hibernation data is associated with a particular range of logical block addresses;

non-volatile memory ("NVM") having a user data portion and a hibernation data portion, wherein the NVM is organized into a multi-level cell configuration into which data can be written therein according to one of a multi-level cell ("MLC") format and a single-level cell ("SLC") format; and NVM interface circuitry operative to:

receive a start hibernate write command that instructs the NVM interface circuitry to operate according to a hibernation mode;

receive write commands comprising the hibernation data stored in the volatile memory; write the hibernation data to the hibernation data portion of the NVM while operating in the hibernation mode, wherein in the hibernation mode, the NVM interface circuitry is operative to write data in the SLC format; and receive a stop hibernate write command that instructs the NVM interface circuitry to operate according to a non-hibernation mode, wherein subsequently received write commands are written to the user data portion of the NVM in the MLC format;

receive a discard hibernate command that instructs the NVM interface circuitry to invalidate the hibernation data written to the hibernation data portion of the NVM.

10. The device of claim 9, wherein the NVM interface circuitry is further operative to:

receive a start hibernate read command that instructs the NVM interface circuitry to operate according to the hibernation mode;

receive read commands;

access the hibernation data from the hibernation data portion of the NVM while operating in the hibernation mode; and receive an end hibernate read command that instructs the NVM interface circuitry to operate according to the non-hibernation mode, wherein subsequently received read commands are read from the user data portion.

11. The device of claim 9, wherein a size of the hibernation data portion is fixed.

12. The device of claim 11, wherein the size of the hibernation data portion is fixed independent of a capacity of the volatile memory.

13. The device of claim 11, wherein the size of the hibernation data portion is fixed dependent on a capacity of the volatile memory.

14. The device of claim 9, wherein a size of the hibernation data portion is dynamic.

15. The device of claim 9, wherein in the non-hibernation mode, the NVM interface circuitry does not have access to the hibernation data portion of the NVM.

16. The device of claim 9, wherein in the non-hibernation mode, the NVM interface circuitry is operative to use the hibernation data portion as a buffer.

* * * * *